United States Patent [19]
Yasufuku et al.

[11] Patent Number: 5,335,876
[45] Date of Patent: Aug. 9, 1994

[54] TAPE CASSETTE LID-LOCKING DEVICE

[75] Inventors: Yoshitaka Yasufuku; Osamu Shibazaki, both of Hino, Japan

[73] Assignee: Konica Corporation, Tokyo, Japan

[21] Appl. No.: 990,545

[22] Filed: Dec. 14, 1992

Related U.S. Application Data

[63] Continuation of Ser. No. 699,681, May 14, 1991, abandoned.

[30] Foreign Application Priority Data

| May 14, 1990 | [JP] | Japan | 2-121167 |
| Sep. 8, 1990 | [JP] | Japan | 2-238604 |
| Oct. 2, 1990 | [JP] | Japan | 2-263082 |

[51] Int. Cl.⁵ .............................. G11B 23/04
[52] U.S. Cl. .................... 242/347.1; 360/132
[58] Field of Search ............. 242/199, 198; 360/132

[56] References Cited

U.S. PATENT DOCUMENTS

| 4,608,616 | 8/1986 | Wakui et al. | 360/132 |
| 4,786,012 | 11/1988 | Ino et al. | 242/198 |
| 4,915,322 | 4/1990 | Schoettle et al. | 360/132 |
| 5,222,686 | 6/1993 | Komeiji et al. | 242/199 |

FOREIGN PATENT DOCUMENTS

| 0088438 | 9/1983 | European Pat. Off. | G11B 23/04 |
| 0097964 | 1/1984 | European Pat. Off. | G11B 23/04 |
| 0103314 | 3/1984 | European Pat. Off. | 360/132 |
| 0260023 | 3/1988 | European Pat. Off. | G11B 23/087 |
| 0311920 | 4/1989 | European Pat. Off. | 360/132 |
| 0384786 | 8/1990 | European Pat. Off. | G11B 23/087 |
| 2508223 | 12/1982 | France | G11B 23/04 |
| 0060475 | 4/1983 | Japan | G11B 23/08 |
| 0062877 | 4/1983 | Japan | 360/132 |
| 0164068 | 9/1983 | Japan | G11B 23/08 |
| 0229287 | 11/1985 | Japan | 360/132 |
| 0258781 | 12/1985 | Japan | G11B 23/087 |
| 0229583 | 12/1987 | Japan | G11B 23/087 |
| 0234476 | 9/1988 | Japan | G11B 23/087 |
| 0234479 | 9/1988 | Japan | G11B 23/087 |
| 2134485 | 8/1984 | United Kingdom | G11B 23/04 |

*Primary Examiner*—Daniel P. Stodola
*Assistant Examiner*—John Q. Nguyen
*Attorney, Agent, or Firm*—Jordan B. Bierman

[57] ABSTRACT

A tape cassette for use in a recording apparatus with a lid lock to lock a front lid of the tape cassette in a closed position. The lid lock includes a fixing portion which fixes the lid lock to the cassette body, and a locking portion with a lock claw which engages the front lid to lock the front lid in the closed position. A reinforcing member formed of a resilient material extends between a support portion and a front leg portion of the lock member to bias the front leg portion of the lock member in a frontal direction toward a locking position. The lock claw locks and releases the front lid by movement caused by the deformation of the lid lock.

8 Claims, 5 Drawing Sheets

TAPE CASSETTE LID-LOCKING DEVICE

This application is a continuation of application Ser. No. 07/699,681, filed May 14, 1991, now abandoned.

BACKGROUND OF THE INVENTION

The present invention relates to a tape cassette which is used in a recording and playback apparatus, and more particularly relates to a tape cassette for 8 mm video use or HDTV use which is provided with a lock member to lock the front lid of the cassette in such a manner that the lock member is moved in the direction confined within a plane parallel to the side wall of the cassette body.

It has been widely known that tape cassettes are conventionally used for a recording or playback apparatus such as a video-tape-recorder.

The conventional tape cassette is generally composed in such a manner that: an upper half case and lower half case made from plastic are combined so that a case body can be made; a supply reel and take-up reel are provided inside the aforementioned case; a magnetic tape follows in a predetermined path between the aforementioned supply and take-up reels; and a front lid is provided in the front portion of the cassette body so that a portion of the magnetic tape outside the cassette body can be protected.

It is also widely known that a lock means is provided in the cassette body in order to keep the front lid closed.

For example, the following tape cassette has been disclosed in the official gazette of Japanese Utility Model No. 12455/1988:

A tape cassette characterized in that: a rotary lid which covers the front portion of a magnetic tape stretched in front of the tape cassette; two side walls which are opposed to each other; a groove portion formed between the extended portion of one of the aforementioned side walls and the side surface of a side plate of the aforementioned rotary lid, wherein the side plate is disposed in the direction perpendicular to the aforementioned tape surface; a cut-out portion formed in the front lower position of the aforementioned rotary lid so that a release member can be allowed to enter into the aforementioned groove portion from the front portion of aforementioned cassette body; a lid lock which can be rotated in the aforementioned groove portion in the direction confined within a plane parallel to the side wall of the cassette body being pivotally supported by the aforementioned side walls, wherein the lid lock is provided with a release end which is faced with the front portion of the aforementioned tape cassette through an engaging end to engage with the aforementioned rotary lid and through the aforementioned cut-out portion, and wherein the lid lock is usually engaged with the aforementioned rotary lid so that the rotary lid can not be rotated, and wherein the lid lock is rotated so that it can be released from the engagement with the aforementioned rotary lid when the aforementioned release member, which enters into the cassette body through the aforementioned cut-out portion and groove portion, comes into contact with the aforementioned release end so that the release end can be moved; and a push spring which pushes the aforementioned lid lock so that the lid lock can be engaged with the aforementioned rotary lid.

In the case of the tape cassette described above, the lid lock and the push spring which pushes the lid lock so that the lid lock can be engaged with the rotary lid, are made of different members. Accordingly, the number of parts are so numerous that parts control is time-consuming and further it is troublesome to assemble the tape cassette.

SUMMARY OF THE INVENTION

The first object of the present invention is to provide a tape cassette characterized in that: the number of parts is small; it is easy to control the parts; and further assembly can be easily carried out.

The second object of the present invention is to provide a tape cassette characterized in that: the front lid locking means is not damaged and durability is high.

The above-described objects of the present invention can be accomplished by a tape cassette, comprising: a case body; a rotary type of front lid which is provided to the case body; and a lock member which is fixed to the aforementioned case body, moved in the direction confined within a plane parallel to the side wall of the case body so that the closed front lid can be locked. In the above-described tape cassette, the lock member is provided with: an extending portion which is connected with a support portion fixed to the case body; a front leg portion which is connected with the extending portion, and on which a lock claw is formed; and a rear leg portion which is engaged with the case body, wherein the aforementioned extending portion, front leg portion and rear leg portion are all made into one unit from a resilient metal.

The above-described objects of the present invention can be accomplished by another tape cassette, comprising: a case body; a rotary type of front lid which is provided to the aforementioned case body; and a lock member which is fixed to the aforementioned case body and moves in the direction confined within a plane parallel to the side wall of the case body in order to lock the front lid when it has been closed. The above-described lock member is provided with: a fixing portion which is fixed to the case body; a lock arm portion in which a lock claw is formed, wherein the lock claw is connected with the aforementioned fixing portion; and an auxiliary member which is used to support the aforementioned lock arm portion.

The above-described objects of the present invention can be accomplished by another tape cassette, comprising: a case body; a rotary type of front lid which is provided to the aforementioned case body; and a lock member which is fixed to the aforementioned case body and moves in the direction confined within a plane parallel to the side wall of the case body in order to lock the front lid when it has been closed. The above-described lock member is provided with: a fixing portion having an extending portion which extends in the front and rear direction of the case body; a lock arm portion which is installed in the tip portion of the extending portion; and a lock claw which is installed in the aforementioned lock arm portion, wherein the aforementioned lock member is composed of a plurality of materials, at least one of which is resilient.

The above-described objects of the present invention can be accomplished by another tape cassette, comprising: a case body; a rotary type of front lid which is provided to the aforementioned case body; and a lock member which is fixed to the aforementioned case body and moves in the direction confined within a plane parallel to the side wall of the case body in order to lock the front lid when it has been closed. The above-described lock member is provided with: a fixing portion having an extending portion which extends in the front and rear direction of the case body; a lock arm portion which is installed in the tip portion of the extending portion; and a lock claw which is installed in the aforementioned lock arm portion, wherein an auxiliary portion to support the lock arm portion is provided between the aforementioned fixing portion and the lock arm portion, and wherein the aforementioned lock member is composed of a plurality of materials, at least one of which is resilient.

The above-described objects of the present invention can be accomplished by another tape cassette, comprising: a case body; a rotary type of front lid which is provided to the aforementioned case body; and a lock member having a resilient engaging portion, wherein the lock member is used to lock the aforementioned front lid when it has been closed. When the engaging portion of the lock member is provided to the aforementioned case body in such a manner that it is resiliently deformed, the lock member is fixed to the case body.

The above-described objects of the present invention can be accomplished by another tape cassette, comprising: a case body; a stepped portion for fixing which is formed on the case body; a front lid which can be opened and closed by rotating motion and which is provided to the aforementioned case body; and a lock member for the front lid which is provided with a resilient engaging portion. When the engaging portion of the lock member is provided to a stepped portion for fixing of the aforementioned case body in such a manner that it is resiliently deformed, the lock member is fixed to the case body.

The above-described objects of the present invention can be accomplished by another tape cassette, comprising: a case body; a rotary front lid which is fixed to the case body; and a lock member to be used to lock the front lid when it has been closed. The aforementioned lock member is provided with: a lock portion which engages with the engaging portion of the front lid; a fixing portion which is fixed to the case body; and a connecting portion which connects the aforementioned lock portion with the fixing portion, wherein the aforementioned connecting portion is made from a material, the elastic modulus of which is 8000–25,000 Kg/mm$^2$.

The elastic modulus of the material composing the connecting portion is preferably 1500 Kg/mm$^2$.

BRIEF DESCRIPTION OF THE DRAWINGS

FIG. 1 to FIG. 3 show an embodiment of the tape cassette of the present invention.

FIG. 4 to FIG. 7 show an embodiment of a tape cassette relating to the present invention.

FIG. 9 and FIG. 10 show another embodiment of a tape cassette relating to the present invention.

FIG. 10 and FIG. 11 show another embodiment of the tape cassette relating to the present invention.

FIG. 10 is a perspective view of the lock member of a front lid; and

FIG. 11 is a perspective view showing a portion of the case body to which the lock member is provided.

DETAILED DESCRIPTION OF THE PREFERRED EMBODIMENT

Figure 1:
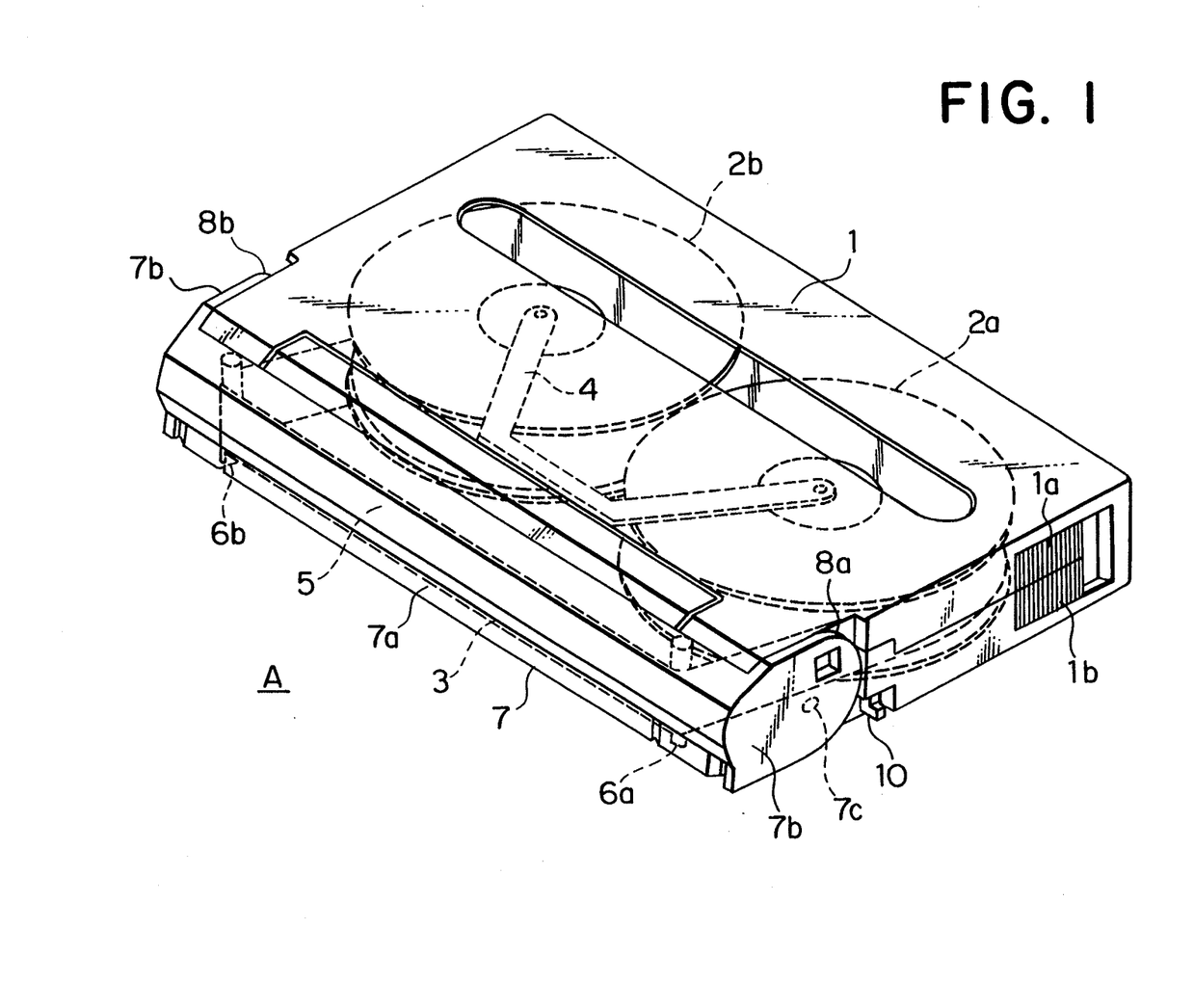
FIG. 1 is a perspective view of the entire tape cassette.
Figure 2:
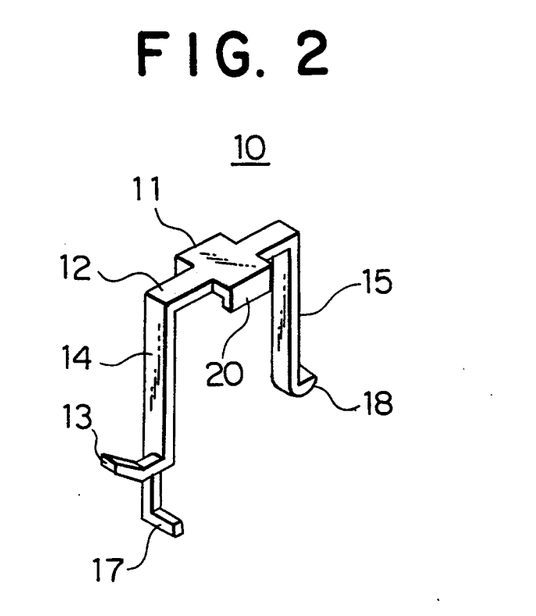
FIG. 2 is a perspective view of a front lid lock member.
Figure 3:
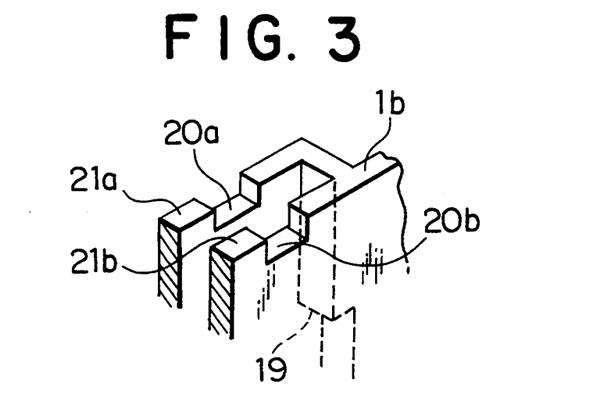
FIG. 3 is a partial perspective view showing a portion of the case body in which the lock member is provided.

FIG. 1 to FIG. 3 show an embodiment of the tape cassette relating to the present invention. FIG. 1 is a perspective view showing the entire tape cassette, FIG. 2 is a perspective view of a lock member of a front lid, and FIG. 3 is a perspective view of a portion of a case body to which the lock member is provided.

A case body 1 of tape cassette A is composed of a rectangular upper half case 1a and lower half case 1b made from synthetic resin such as polypropylene, ABS, PS and the like. These upper half case 1a and lower half case 1b are fastened to each other, and fixed by set screws so that they are formed into a box shape.

A pair of tape reels, a supply reel 2a and a take-up reel 2b, are rotatably provided inside the case body 1, and a magnetic tape 3 (which will be called a tape, hereinafter) is stretched between the supply reel 2a and the take-up reel 2b. Both tapes 2a, 2b are placed on a bottom plate of the lower half case 1b, and the lower edges of the reels are engaged with reel engaging holes formed in the bottom plate so that the reels can be positioned.

Numeral 4 is a pair of set springs which are used to set the tape reels 2a, 2b.

As shown in FIG. 1, a front opening 5 is formed in the front portion of the tape cassette in such a manner that the front opening is extended over the cassette width, and a bottom surface opening is formed in the bottom plate of the lower half case 1b. (A tape loading member of a recording and playback apparatus enters into a pocket formed by the front opening 5 and the bottom opening, and pulls out tape 3 from tape cassette A.) A front wall is integrally formed on the bottom plate of the lower half case 1b along the edge portion of the bottom opening. This front wall separates the space inside the case body 1 into two spaces, one is the space on the bottom opening side and the other is the space on the tape reels 2a, 2b side. On the right and left sides of the front wall, a pair of tape guides 6a, 6b are integrally formed on the bottom plate of the lower half 1b. The above-described tape 3 is guided by the tape guides 6a, 6b and spread along the front opening.

The front opening 5 is covered by a U-shaped front lid 7. The front lid 7 is a molding made from synthetic resin such as polypropylene, ABS and PS, which is provided with: a front plate 7a which closes the front portion of the case body 1; connecting members 7b which are protruded in the rear direction of the cassette body from the aforementioned front plate 7a; and rotative shafts 7c which are protruded from the inner surfaces of both connecting members 7b in such a manner that the rotative shafts 7c are opposed to each other. The right and left connecting members 7b are engaged with front end cut-out portions 8a, 8b formed in the right and left side-walls of the case body 1, and the aforementioned rotative shafts 7c are pivotally engaged with holes formed in the aforementioned cut-out portions 8a, 8b. The front lid 7 can be freely rotated around the rotative shafts 7c in such a manner that: the front lid 7 closes the front portion of the case body 1; and the front lid 7 is opened upward. For example, the front lid 7 is pushed by a spring means such as a torsion spring 9 (not illustrated in the drawing) which is provided around the right rotative shaft 7c so that the front lid 7 can be kept closed.

The pushing means of the front lid 7 is not limited to the spring means described above, but any means can be applied.

In the position where the aforementioned pocket is formed, a dust cover is provided in order to prevent dust from entering into the cassette and adhering onto the surface of the tape 3, wherein the dust cover is installed in such a manner that:the dust cover is rotatably provided inside the front lid 7 through a shaft so that the lower side, inside and upper side of tape cassette A can be covered by the duct cover. This dust cover is connected with cam grooves which are provided on the right and left side-surfaces which are faced with the pocket, wherein these side-surfaces are connected with the tape guides 6a, 6b. When the front lid 7 is opened, the dust cover is moved upward together with the front lid 7 without interfering with the tape 3. Specifically, dust cover setting members are vertically provided to the right and left end portions of the front plate 7a of the front lid 7 from the upper end of the front plate 7a. Shafts protruded from right and left sides of the middle portion of the dust cover are pivotally engaged with the aforementioned dust cover setting members. Pin-shaped cam-followers are protruded from the right and left sides of the lower end portion of the dust cover, and the cam-followers are engaged with the aforementioned cam grooves.

The above-described structure is common in each of the embodiments of the tape cassette of the present invention.

Numeral 10 is a lock member. The lock member 10 is made in such a manner that: a resilient metal sheet such as a stainless steel sheet is punched and shaped. As illustrated in FIG. 2, the lock member 10 is a U-shaped member comprising: a support portion 11 which is fixed to the case body 1 (the lower case 1b); an extending portion 12 which is connected with the aforementioned support portion 11; a front leg portion 14 which is connected with the extending portion 12 and on which a lock claw is formed which will be described later; and a rear leg portion 15 which engages with the case body 1 (the lower case 1b).

Numeral 13 is a lock claw which engages with an engaging portion (which is not illustrated in the drawing) of the front lid 7. This lock claw 13 may be composed of a resilient metal sheet, such as a stainless steel sheet, integrally with the front leg portion 14, or the lock claw 13 may be made in such a manner that: a plastic lock claw which has been formed into a predetermined shape is adhered to the front leg portion 14.

Numeral 17 is a release end used to release the front lid 7 which has been locked by the lock member 10. This release end 17 may be composed of a resilient metal sheet such as a stainless steel sheet integrally with the front leg portion 14, or the release end 17 may be made in such a manner that: a plastic release end which has been formed into a predetermined shape is adhered to the front leg portion 14.

Numeral 18 is an engaging claw which is engaged with an engaging portion 19 of the case body 1 (the lower half case 1b). This engaging claw 18 may be composed of a resilient metal sheet such as a stainless steel sheet integrally with the rear leg portion 15, or the engaging claw 18 may be made in such a manner that: a plastic engaging claw which has been formed into a predetermined shape is adhered to the rear leg portion 15.

Numerals 20a, 20b are rectangular cut-out portions formed on vertical walls 21a, 21b. When the support portion 11 of the lock member 10 is disposed in the cut-out portions 20a, 20b, the lock member 10 is assembled to the lower half case 1b (the case body 1). It can be understood from the structure of the lock member that the lock member 10 of the present invention is not rotated, which is different from the lock member of a conventional tape cassette.

Figure 4:
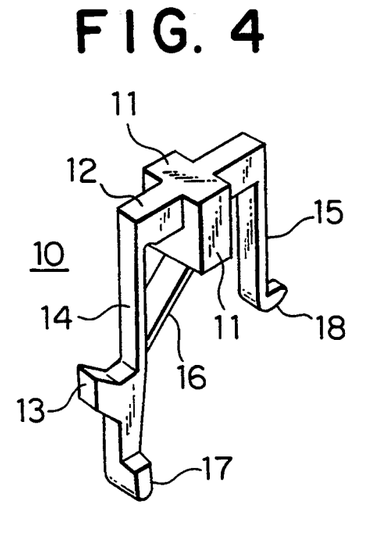
FIG. 4 is a perspective view of the lock member of a front lid.
Figure 5:
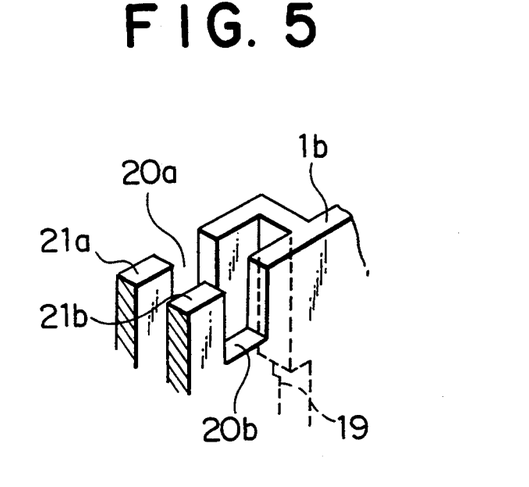
FIG. 5 is a perspective view of a portion of the case body to which this lock member is provided.

FIG. 4 and FIG. 5 show an embodiment of the present invention. The lock member 10 in FIG. 4 is made from flexible plastic material with a specific forming method. As shown in FIG. 4, the lock member 10 comprises: a support portion 11 which is fixed to the case body 1 (the lower half case 1b); an extending portion 12 which is connected with the support portion 11; a front leg portion 14 which is connected with the front edge of the extending portion 12, and on which a lock claw 13 is provided; a rear leg portion 15 which is connected with the rear edge of the aforementioned extending portion 12, and which is used to lock the lock member 10 in the case body, wherein the extending portion 12, the front leg portion 14 and the rear leg portion 15 are formed into a C-shape; and a spring portion 16, one end of which slidably comes into contact with the rear side of the aforementioned front leg portion 14, and the other end of which is connected with the support portion 11 in order to prevent bending of the front leg portion 11.

The spring portion 16 may be molded integrally with the lock member 10 when the lock member 10 is molded, or the spring portion 16 may be adhered to the lock member 10 after the lock member has been molded. The spring portion 16 may be made from metallic material or plastic material.

In order to prevent the disconnection of the tip of the spring portion 16 from the front leg portion 14, it is preferable to form a groove on the sliding surface of the front leg potion 14 so that the tip of the spring portion 16 can positively engage with the groove.

Numeral 17 is a release member which has been formed on the front leg portion 14 in order to release the lock of the front lid 7 conducted by the lock member 10. The release member 17 is formed integrally with the lock member 10.

Numeral 18 is an engaging claw formed on the rear leg portion 15, wherein the engaging claw 18 engages with the engaging portion 19 of the case body 1 (the lower half case 1b). This engaging claw 18 is formed integrally with the lock member 10 when the lock member 10 is molded.

The support portion 11, the extending portion 12, the rear leg portion 15 and the engaging claw 18 are defined as a fixing portion, hereinafter. The front leg portion 14, the lock claw 13 and the releasing member 17 are defined as a lock arm portion.

Numerals 20a, 20b are rectangular cut-out portions formed on vertical walls 21a, 21b of the lower half case 1b. When the support portion 11 of the lock member 10 is disposed in the cut-out portions 20a, 20b, the lock member 10 is assembled to the lower half case 1b (the case body 1). It can be understood from the structure of the lock member that the lock member 10 of the present invention is not rotated, which is different from the lock member of a conventional tape cassette.

In tape cassette A which has been composed in the manner described above, the front lid 7 is closed so as to protect the front outside of the tape 3 when the cassette is not used. When tape cassette A is set into a recording and playback apparatus, the front lid 7 is opened, a tape loading member (not illustrated in the drawing) enters into a pocket formed in the front middle portion of the tape cassette and pulls out the tape 3 in the front direction.

More specifically, when tape cassette A is set into the recording and playback apparatus, the tape 3 is pulled out in the front direction by the tape loading member (not illustrated in the drawing) of the recording and playback apparatus in such a manner that: the lock release member of the recording and playback apparatus moves the release member 17 of the lock member 10 counterclockwise in FIG. 1 resisting the spring force of the front leg portion 14 of the lock member 10; accordingly, the front leg portion 14 of the lock member 10 is also moved, so that the lock claw 13 is released from the engaging portion of the front lid 7, and the front lid 7 is placed under the condition that it can be opened; therefore, by the action of a lid opening member (not shown in the drawing), the front lid 7 is rotated clockwise in FIG. 1 so that it can be opened; and the tape loading member (not shown in the drawing) enters into the pocket formed in the front middle portion of the tape cassette so that the tape loading member pulls out the tape 3 in the front direction.

In the above-described tape cassette A, assembly is conducted as follows: the support portion 11 which is connected with the extending portion 12 of the lock member 10, is put into the rectangular positions 20a, 20b formed on the vertical walls 21a, 21b of the lower half case 1b; and the upper half case 1a is fastened with the lower half case 1b. Accordingly, productivity of assembly work is remarkably high.

Although the lock member 10 is repeatedly deformed when the front lid 7 is opened and closed, the spring portion 16 is provided to the lock member 10 in order to reinforce the front leg portion 14, so that durability of the tape cassette is high and it is hardly damaged.

Further, the lock member 10 can be easily manufactured, and its manufacturing cost is not so high.

The support portion 11 of the lock member 10 is engaged with the cut-out portions 20a, 20b of the lower half case 1b, and further the engaging claw 18 of the lock member 10 is engaged with the engaging portion 19 of the case body (the lower half case 1b). Consequently, even if the front leg portion 14 of the lock member 10 is bent while the front lid is opened or closed, the lock member 10 is positively held, so that the reliability of lock member operation is high.

Figure 6:
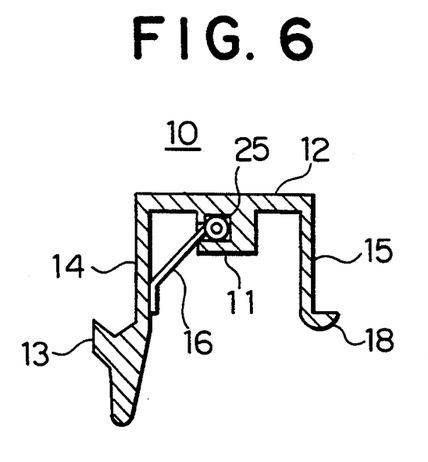
FIG. 6 to FIG. 8 are sectional views of the main portion (which is the lock member of the front lid) of a tape cassette of another embodiment.

FIG. 6 is a sectional view of the main portion of another embodiment of the tape cassette relating to the present invention.

In the embodiment explained before, a plate-shaped spring portion 16 is fixed to the support portion 11. On the other hand, in this embodiment, a helical spring 16 is provided in a cut-out portion 25 formed in the support portion 11, and the tip of this helical spring 16 resiliently comes into contact with the surface of the groove formed on the front leg portion 14 of the lock member 10. However, technical concepts of the two embodiments are essentially the same, so that the detailed explanation will be omitted.

Figure 7:
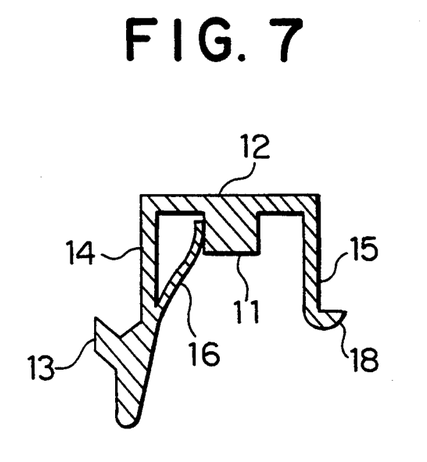

In the embodiment shown in FIG. 4, the tip of the spring portion 16 resiliently comes into contact with the front leg portion 14. The spring portion 16 may be provided to the front leg portion 14 as illustrated in FIG. 7, and the Lip of the spring portion 16 may resiliently come into contact with the support portion 11.

The characteristics of the tape cassette shown in FIG. 4 to FIG. 7 are described as follows. The tape cassette explained in FIG. 4 to FIG. 7 comprises: a case body; a rotative front lid which is provided to the case body; and a lock member which is fixed to the case body and moved in the direction confined within a plane parallel to the side wall of the tape cassette so that the front lid can be locked, wherein the lock member is provided with a support portion which is fixed to the case body, a front leg portion which is connected with the support portion and on which a claw is provided, and an auxiliary member which supports the front leg portion. Accordingly, the efficiency is remarkably high when the front lid lock mechanism is assembled. Even if the lock member is repeatedly deformed when the front lid is opened and closed, and even if a plastic material which is plastically deformed as compared with a metallic material, is used for the lock member, the durability of the lock member is so high that it is not damaged. Further, the aforementioned lock member can be easily made, so that the manufacturing cost is low, and the reliability of the locking operation is high.

In the following two embodiments, the basic shapes of the tape cassettes are the same as those illustrated in FIG. 4 to FIG. 6. Accordingly, the tape cassettes of the two embodiments will be explained referring to FIG. 4 to FIG. 6.

In FIG. 4 and FIG. 5, numeral 10 is a lock member. The lock member 10 in FIG. 4 is made from resilient plastic material or metallic material with a specific forming method. As shown in FIG. 4, the lock member 10 comprises: a support portion 11 which is fixed to the case body 1 (the lower half case 1b); an extending portion 12 which is connected with the support portion 11; a front leg portion 14 which is connected with the front edge of the extending portion 12, and on which a lock claw 13 is provided; a rear leg portion 15 which is connected with the rear edge of the aforementioned extending portion 12, and which is used to lock the lock member 10 in the case body, wherein the extending portion 12, the front leg portion 14 and the rear leg portion 15 are formed into a C-shape; and a spring portion 16, one end of which slidably comes into contact with the rear side of the aforementioned front leg portion 14, and the other end of which is connected with the support portion 11 in order to prevent the bend of the front leg portion 11.

The spring portion 16 may be composed in such a manner that: the lock member 10 is integrally molded together with a spring member made from stainless steel by the insert molding method, or the spring portion 16 may be adhered to the lock member 10 after the lock member has been molded. The material of the spring portion 16 is not limited to metallic materials, and plastic materials having elasticity different from the aforementioned plastic material, may be used.

In order to prevent the disconnection of the tip of the spring portion 16 from the front leg portion 14, it is preferable to form a groove on one sliding surface of the front leg potion 14 so that the tip of the spring portion 16 can positively engage with the groove.

Numeral 17 is a release member which has been formed on the front leg portion 14 in order to release the lock of the front lid 7 conducted by the lock member 10. The release member 17 is formed integrally with the lock member 10.

Numeral 18 is an engaging claw formed on the rear leg portion 15, wherein the engaging claw 18 engages with the engaging portion 19 of the case body 1 (the lower half case 1b). This engaging claw 18 is formed integrally with the lock member 10 when the lock member 10 is molded.

Numerals 20a, 20b are rectangular cut-out portions formed on vertical walls 21a, 21b of the lower half case 1b. When the support portion 11 of the lock member 10 is disposed in the cut-out portions 20a, 20b, the lock member 10 is assembled to the lower half case 1b (the case body 1). It can be understood from the structure of the lock member that the lock member 10 of the present invention is not rotated, which is different from the lock member of a conventional tape cassette.

In tape cassette A which has been composed in the manner described above, the front lid 7 is closed so as to protect the front outside of the tape 3 when the cassette is not used. When tape cassette A is set into a recording and playback apparatus, the front lid 7 is opened, a tape loading member (not illustrated in the drawing) enters into a pocket formed in the front middle portion of the tape cassette and pulls out the tape 3 in the front direction.

More specifically, when tape cassette A is set into the recording and playback apparatus, the tape 3 is pulled out in the front direction by the tape loading member (not illustrated in the drawing) of the recording and playback apparatus in such a manner that: the lock release member of the recording and playback apparatus moves the release member 17 of the lock member 10 counterclockwise in FIG. 1 resisting the spring force of the front leg portion 14 of the lock member 10; accordingly, the front leg portion 14 of the lock member 10 is also moved, so that the lock claw 13 is released from the engaging portion of the front lid 7, and the front lid 7 is placed under the condition that it can be opened; therefore, by the action of a lid opening member (not shown in the drawing), the front lid 7 is rotated clockwise in FIG. 1 so that it can be opened; and the tape loading member (not shown in the drawing) enters into the pocket formed in the front middle portion of the tape cassette so that the tape loading member pulls out the tape 3 in the front direction.

In the above-described tape cassette A, assembly is conducted as follows: the support portion 11 which is connected with the extending portion 12 of the lock member 10, is put into the rectangular positions 20a, 20b formed on the vertical walls 21a, 21b of the lower half case 1b; and the upper halt case 1a is fastened with the lower half case 1b. Accordingly, productivity of assembly work is remarkably high.

Although the lock member 10 is repeatedly deformed when the front lid 7 is opened and closed, the spring portion 16 is provided to the lock member 10 in order to reinforce the front leg portion 14, so that durability of the tape cassette is high and it is hardly damaged.

Further, the lock member 10 can be easily manufactured, and its manufacturing cost is not so high.

The support portion 11 of the lock member 10 is engaged with the cut-out portions 20a, 20b of the lower half case 1b, and further the engaging claw 18 of the lock member 10 is engaged with the engaging portion 19 of the case body (the lower half case 1b). Consequently, even if the front leg portion 14 of the lock member 10 is bent while the front lid is opened or closed, the lock member 10 is positively held, so that the reliability of lock member operation is high.

FIG. 6 is a sectional view of the main portion of another embodiment of the tape cassette relating to the present invention.

In the embodiment explained before, a plate-shaped spring portion 16 is fixed to the support portion 11. On the other hand, in this embodiment, a helical spring 16 is provided in a cut-out portion 25 formed in the support portion 11, and the tip of this helical spring 16 resiliently comes into contact with the surface of the groove formed on the front leg portion 14 of the lock member 10. However, technical concepts of the two embodiments are essentially the same, so that the detailed explanation will be omitted.

Figure 8:
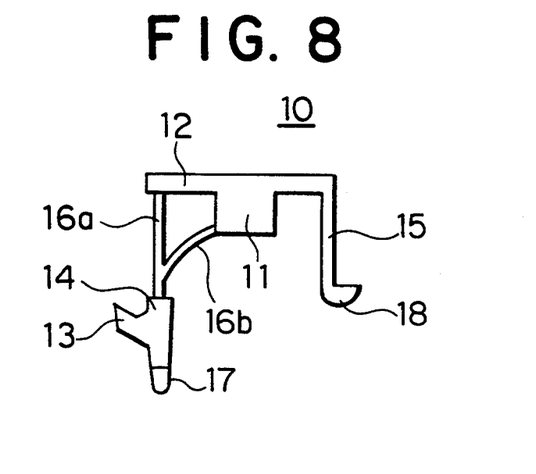

FIG. 8 is a side view of the main portion (the lock member of a front lid) of another embodiment of a tape cassette according to the present invention.

In the case of the aforementioned first embodiment, the extending portion 12 and the front leg portion 14 are integrally formed from resin. In the case of this embodiment, spring members 16a, 16b made from a metal such as stainless steel are provided by the insert forming method between a support portion 11 and a front leg portion 14, and between an extending portion 12 and the front leg portion 14, wherein the support portion 11, the extending portion 12 and the front leg portion 14 are made from resin. Except for this, the technical concepts of the aforementioned two embodiment s are the same, so that the detailed explanation will be omitted.

Although the metallic spring members 16a, 16b are provided in this embodiment, the metallic spring member 16b may be omitted.

In the aforementioned three embodiments relating to the present invention, the tape cassette comprises: a case body; a rotative front lid which is provided to the case body; and a lock member which is fixed to the aforementioned case body and which moves in the direction confined within a plane parallel to the side wall of the cassette in order to lock the front lid, wherein this lock member is provided with a support portion having an extending portion which extends in the front and rear direction of the case body, a front leg portion which is connected with the tip of the extending portion, and a lock claw which is installed in the front leg portion, and wherein the aforementioned lock member can be composed of a plurality of materials, at least one of which is flexible. Accordingly, the efficiency is remarkably high when the front lid lock mechanism is assembled. Even if the lock member is repeatedly deformed when the front lid is opened and closed, the durability of the lock member is so high that it is not damaged. Further, the aforementioned lock member can be easily made, so that the manufacturing cost is low, and the reliability of the locking operation is high.

The tape cassette of the present invention comprises: a case body; a rotative front lid which is provided to the case body; and a lock member which is fixed to the aforementioned case body and which moves in the direction confined within a plane parallel to the side wall of the cassette in order to lock the front lid, wherein this lock member is provided with a support portion having an extending portion which extends in the front and rear direction of the case body, a front leg portion which is connected with the tip of the extending portion, a lock claw which is installed in the front leg portion, and an auxiliary member between the aforementioned support portion and the front leg portion in order to support the front leg portion, and wherein the aforementioned lock member can be composed of a plurality of materials, at least one of which is resilient. Accordingly, the efficiency is remarkably high when the front lid lock mechanism is assembled. Even if the lock member is repeatedly deformed when the front lid is opened and closed, the durability of the lock member is so high that it is not damaged. Further, the aforementioned lock member can be easily made, so that the manufacturing cost is low, and the reliability of the locking operation is high.

Figure 9:
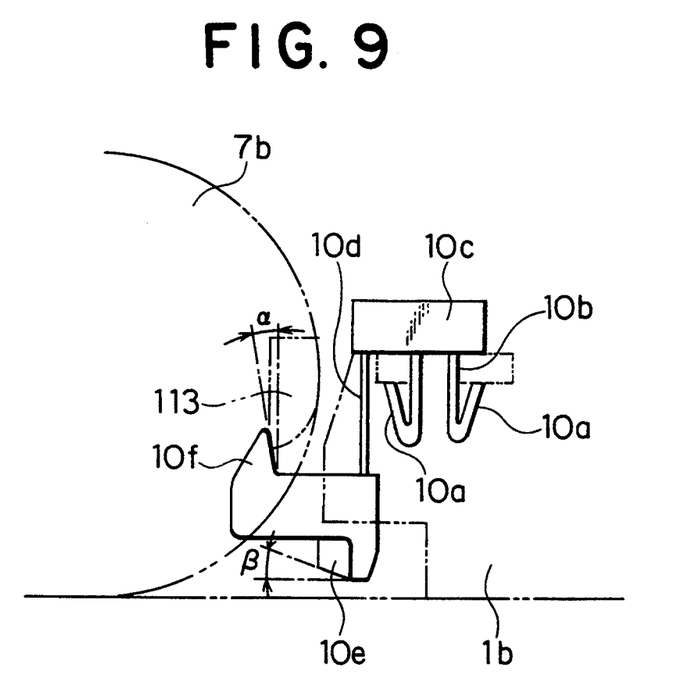
FIG. 9 is a side view of the main portion.
Figure 10:
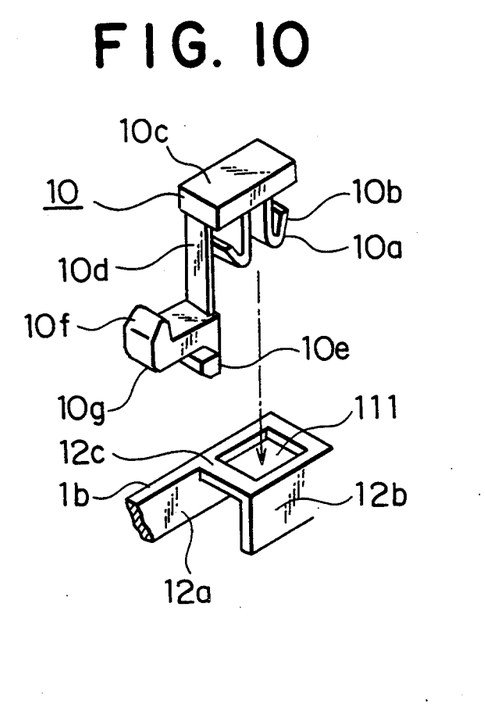
FIG. 10 is a perspective view showing a lock member and a portion of a case body to which this lock member is provided.

FIG. 9 and FIG. 10 show another embodiment of the tape cassette of the present invention. FIG. 9 is a partially sectional side view of the main portion of the tape cassette, and FIG. 10 is a perspective view of a lock member and a portion of a case body to which the lock member is provided.

Numeral 10 is a lock member which is made of a leaf spring and molded resin such as polyacetal by the insert forming method.

As illustrated in FIG. 9 and FIG. 10, the lock arm 10 of this embodiment comprises: a pair of resilient engaging arms 10b made from resin, which are fixed to the case body 1 (in this case, the lower half case 1b), wherein claw-shaped engaging portions 10a are provided to the engaging arms 10b; a base portion 10c made from resin which is used for the base of engaging arms 10b; a leaf spring 10d made from a resilient metal which is vertically provided to the tip portion of the base portion 10c; a release edge 10e which is provided to the lower edge portion of the leaf spring 10d; and a lock portion 10g made from resin on which a lock claw 10f is provided.

Numeral 111 is an opening which is formed in the case body 1 (in this embodiment, a horizontal plate portion 12c which connects vertical walls 12a, 12b). The lock member 10 is provided to the case body 1 by the so-called "snap" method in such a manner that: when an engaging arm 10b of the lock member 10 is engaged in the opening 111, the engaging arm 10b is resiliently deformed and enters into the lower portion of the opening 111; and claw-shaped engaging portion 10a is engaged with the lower surface of the horizontal plate portion 12c, so that the lock member 10 is provided to the case body 1.

It should be understood from the structure of the lock member 10 that the lock member 10 is not rotated in the embodiment, whereas the lock member of a conventional tape cassette is rotated in the operation.

Numeral 113 is an engaging portion which is formed in a predetermined position of a connecting member 7b of the front lid 7. When a lock claw 10f of the lock member 10 is engaged with the engaging portion 113, the front lid 7 is locked.

In tape cassette A composed in the manner described above, when it is not used, the front lid 7 is closed so that the front outside of the tape 3 can be protected.

When tape cassette A is loaded in a recording and playback apparatus, the front lid is opened and a tape loading member (not illustrated in the drawing) of the recording and playback apparatus enters into a pocket formed in the front middle portion of the case body so that the tape 3 is pulled out from the tape cassette.

Specifically, the operation can be described as follows. When tape cassette A is set in the recording and playback apparatus, the release member (not illustrated in the drawing) of the recording and playback apparatus enters, and the release edge 10e of the lock member 10 is moved by the release mender to the right in FIG. 9 while the release member resists the spring force of the leaf spring 10d of the lock member 10. Therefore, the lock claw 10f is released from the engaging portion 13 of the front lid 7 so that the front lid 7 can be opened and closed. The front lid 7 is rotated and opened clockwise in FIG. 1 by the operation of art opening member (not shown in the drawing) of the recording and playback apparatus. Then the tape loading member (not shown in the drawing) enters into the pocket formed in the front middle portion of the cassette body and pulls out the tape 3 front the tape cassette in the front direction.

In aforementioned tape cassette A, assembly work is very simple in that the engaging arm 10b of the lock member 10 is engaged with the opening 111, so that the efficiency of assembling work is remarkably high.

When the claw-shaped engaging portion 10a is engaged with the horizontal plate portion 12c of the lower half case 1b, the lock member 10 can be positively fixed, and the efficiency tape cassette assembling work is very high.

Although the lock member 10 is repeatedly deformed when the front lid 7 is opened and closed, the deformed portion of the lock member 10 is composed of the durable leaf spring 10d, so that the durability of the tape cassette is very high.

Further, the lock member 10 can be easily made. Consequently, its manufacturing cost is not so high.

In the above-described embodiment, the lock member 10 is engaged with the horizontal plate portion 12c of the lower half case 1b, because a pair of plastic engaging arms 10b are provided downward to the base portion 10c. It the pair plastic engaging arms 10b are provided upward to the base portion 10c, the lock member 10 can be fixed to the upper case 1a.

In the embodiment described above, the lock member 10 is pushed in the upper and lower direction with regard to the upper half case 1a or the lower half case 1b so that it can be fixed. If the lock member 10 were composed in such a manner that the base portion 10c was provided on the same surface as the leaf spring 10d, and that the engaging arm 10b was vertically provided on the rear side of the base portion 10c, the lock member 10 could be fixed to the upper half case 1a or the lower half case 1b when the lock member 10 is pushed in the horizontal direction with regard to an opening formed on the vertical plate portion.

The lock member 10 may be fixed to the upper case 1a or the lower case 1b from the side of the tape cassette.

Figure 11:
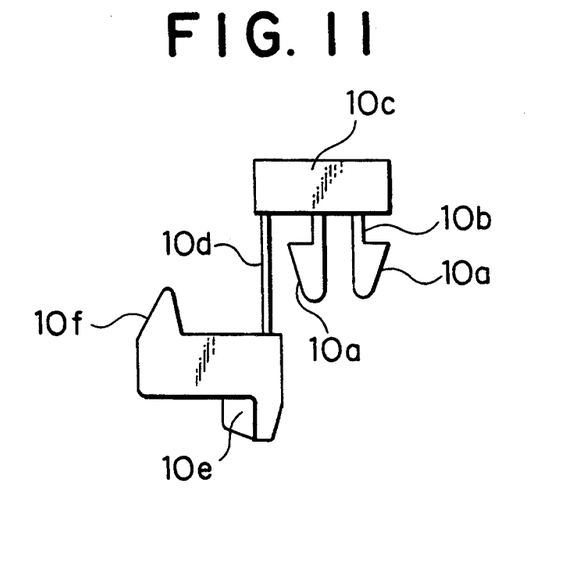
FIG. 11 is a side view showing the main portion (the lock member) of a tape cassette which is one of the variations.

FIG. 11 is a side view of the main portion (the lock member) of the tape cassette of another embodiment relating to the present invention.

This embodiment is different from the aforementioned embodiment in terms of the shape of the claw-shaped engaging portion 10a, but the basic technical concept is the same. Accordingly, the detailed explanation will be omitted.

Two embodiments will be explained as follows, wherein the essential shapes of parts are the same as those shown in FIG. 9 to FIG. 11. Therefore, the embodiments will be explained referring to FIG. 9 to FIG. 11.

FIG. 9 is a partially sectional side view of the main portion of the tape cassette, and FIG. 10 is a perspective view of a lock member and a portion of a case body to which the lock member is provided.

Numeral 10 is a lock member which is made of a leaf spring and molded resin such as polyacetal by the insert forming method.

As illustrated in FIG. 9 and FIG. 10, the lock arm 10 of this embodiment comprises: a pair of resilient engaging arms 10b made from resin, which are fixed to the case body 1 (in this case, the lower half case 1b), wherein claw-shaped engaging portions 10a are provided to the engaging arms 10b; a base portion 10c made from resin which is used for the base of engaging arms 10b; a leaf spring 10d made from stainless steel which is vertically provided to the tip portion of the base portion 10c, wherein the elastic modulus of the leaf spring is 19,000 Kg/mm$^2$, the width 0.8–1.2 mm, the length 4–8 mm, and the thickness 0.08–0.2 mm; a release edge 10e which is provided to the lower edge portion of the leaf spring 10d; and a lock portion 10g made from resin on which a lock claw 10f is provided.

The shape of the lock claw is determined so that angle $\alpha$ can be 2°–12° C., for example 8° C., which is formed by the engaging surface of the lock claw 10f engaged with the engaging portion 113, and the virtual vertical surface illustrated by a one-dotted chain line.

Further, the shape of the lock claw is determined so that angle $\beta$ can be 10°–30° C., for example 20° C., which is the release tapered angle at the release edge 10e, wherein the release tapered angle is an angle which is formed by the tapered surface and the horizontal surface.

Numeral 111 is an opening which is formed in the case body 1 (in this embodiment, a horizontal horizontal plate portion 12c which connects vertical walls 12a, 12b). The lock member 10 is provided to the case body 1 by the so-called snap method in such a manner that: when an engaging arm 10b of the lock member 10 is engaged in the opening 111, the engaging arm 10b is resiliently deformed and enters into the lower portion of the opening 111; and claw-shaped engaging portion 10a is engaged with the lower surface of the horizontal plate portion 12c, so that the lock member 10 is provided to the case body 1.

It should be understood from the structure of the lock member 10 that the lock member 10 is not rotated in the embodiment, whereas the lock member of a conventional tape cassette is rotated in the operation.

Numeral 113 is an engaging portion which is formed in a predetermined position of a connecting member 7b of the front lid 7. When a lock claw 10f of the lock member 10 is engaged with the engaging portion 113, the front lid 7 is locked.

In tape cassette A composed in the manner described above, when it is not used, the front lid 7 is closed so that the front outside of the tape 3 can be protected. When tape cassette A is loaded in a recording and playback apparatus, the front lid is opened and a tape loading member (not illustrated in the drawing) of the recording and playback apparatus enters into a pocket formed in the front middle portion of the case body so that the tape 3 is pulled out from the tape cassette.

Specifically, the operation can be described as follows. When tape cassette A is set in the recording and playback apparatus, the release member (not illustrated in the drawing) of the recording and playback apparatus enters into the cassette and comes into contact with the release tapered surface of the release edge 10e of the lock member 10. When the release member of the recording and playback apparatus enters, the release edge 10e of the lock member 10 is moved by the release member to the right in FIG. 9 while the release member resists the spring force of the leaf spring 10d of the lock member 10. Therefore, the lock claw 10f is released from the engaging portion 13 of the front lid 7 so that the front lid 7 can be opened and closed. The front lid 7 is rotated and opened clockwise in FIG. 1 by the operation of an opening member (not shown in the drawing) of the recording and playback apparatus. Then the tape loading member (not shown in the drawing) enters into the pocket formed in the front middle portion of the cassette body and pulls out the tape 3 from the tape cassette in the front direction.

In aforementioned tape cassette A, assembly work is very simple in that the engaging arm 10b of the lock member 10 is engaged with the opening 111, so that the efficiency of assembling work is remarkably high.

When the claw-shaped engaging portion 10a is engaged with the horizontal plate portion 12c of the lower half case 1b, the lock member 10 can be positively fixed, and the efficiency of tape cassette assembling work is very high.

Although the lock member 10 is repeatedly deformed when the front lid 7 is opened and closed, the deformed portion of the lock member 10 is composed of the durable leaf spring 10d, which is made from a material, the elastic modulus of which is 8000–25,000 Kg/mm$^2$, so that the durability of the tape cassette is very high.

In the tape cassette of the present invention, there is little possibility of the front lid 7 being accidentally opened due to deterioration of the lock mechanism.

Further, the lock member 10 can be easily made so that its manufacturing cost is not so high.

Furthermore, the shape of the lock claw is determined so that angle $\alpha$ can be 2°–12° C., formed by the engaging surface of the lock claw 10f engaged with the engaging portion 113, and the virtual vertical surface illustrated by a one-dotted chain line. Accordingly, when the lock claw 10f is engaged with the engaging portion 113 so that the leaf spring 10d is deformed, its operational ability is excellent, and lock and release motions can be positively conducted, and further the durability of the leaf spring 10d is high.

Further, the shape of the lock claw is determined so that release tapered angle $\beta$ can be 10°–30° C. Therefore, when the release member (not illustrated in the drawing) of the recording and playback apparatus enters into the cassette, comes into contact with the release tapered surface of the release edge 10e, and further enters into the cassette so that the release can be conducted by moving the release edge 10e in the rear direction in FIG. 1 resisting the spring force of the leaf spring 10d of the lock member 10, the lock and release operation can be positively carried out and the leaf spring 10d is not deformed excessively. Consequently, the durability of the leaf spring 10d is excellent.

In the above-described embodiment, the leaf spring 10d is made from stainless steel, the elastic modulus of which is 19,000 Kg/mm². However, the leaf spring 10d may be made from phosphor bronze, the elastic modulus of which is 11,000 Kg/mm².

The tape cassette of the present invention comprises: a case body; a rotative front lid which is provided to the case body; and a lock member which is used to lock the front lid. The above-described lock member is provided with: a lock portion which engages with an engaging portion of the front lid; a support portion which is fixed to the case body; and a connecting portion which connects the aforementioned lock portion with the support portion, wherein the aforementioned connecting portion is made from a material, the elastic modulus of which is 8000–25,000 Kg/mm².

Accordingly, the tape cassette of the present invention can provide the following effects: the number of parts of the front lid lock mechanism are small; its assembling efficiency is remarkably high; and the durability of the lock member is high even if the lock member is repeatedly deformed when the front lid is opened and closed, because the deformed portion of the lock member is made from a material, the elastic modulus of which is 8000–25,000 Kg/mm². Consequently, the lock member is very resilient, and there is little possibility of an accident in which the front lid is suddenly opened due to deterioration of the front lid lock. As a result the tape is scarcely damaged.

What is claimed is:

1. A tape cassette for use in a recording apparatus, said cassette comprising:
   - a case body having first and second substantially parallel side walls, a rear wall, and a front wall having a front opening;
   - a front lid pivotable about a pivot perpendicular to said side walls between an open position and a closed position, said front lid closing said front opening in said closed position, and opening said front opening in said open position; and
   - a lock member for locking said front lid in said closed position, said lock member comprising:
     - a support portion for supporting said lock member, said support portion being nested in a corresponding recess formed in said case body, a front extending portion extending from said support portion in a frontal direction toward said front opening,
     - a front leg portion extending from a front end of said front extending portion,
     - a lock claw affixed to said front leg portion, said lock claw locking said front lid in said closed position by engaging with an engaging portion of said front lid, and
     - a reinforcing member formed of a resilient material extending between said support portion and said front leg portion for biasing said front leg portion in said frontal direction toward a locking position.

2. The cassette of claim 1 wherein at least said front leg portion is formed of a resilient material.

3. The cassette of claim 1 wherein the modulus of elasticity of said resilient material is between 8000 Kg/mm² and 25,000 Kg/mm².

4. The cassette of claim 1 wherein both said cut-out portion of said case body and said engaging portion of said case body are provided in said lower half of said case body.

5. The cassette of claim 1 wherein one end of said reinforcing member is fixed to said support portion, and another end of said reinforcing member slidably contacts said front leg portion.

6. The cassette of claim 1 where one end of said reinforcing member is fixed to said front leg portion and another end slidably contacts said support portion.

7. The cassette of claim 1 wherein said front leg is formed of a metallic material.

8. The tape cassette of claim 1 wherein said reinforcing member is formed of a metallic material.

* * * * *